United States Patent [19]
Duchateau et al.

[11] Patent Number: 5,560,304
[45] Date of Patent: Oct. 1, 1996

[54] PROCESS FOR THE VITRIFICATION OF PRODUCTS IN THE FORM OF SOLID PIECES OR PARTICLES

[75] Inventors: Eric Duchateau, Versailles; Eberhard Kloers, Boulogne-Billancourt, both of France; Angelo Vigorelli, Milan, Italy

[73] Assignees: L'air Liquide, Societe Anonyme Pour L'etude et L'exploitation des Procedes Georges Claude, Paris Cedex, France; Sogemi - Societa Generale Macchine Impianti, Milan, Italy

[21] Appl. No.: 407,661

[22] Filed: Mar. 21, 1995

[30] Foreign Application Priority Data

Mar. 23, 1994 [FR] France .................. 94 03398

[51] Int. Cl.⁶ .................. F27B 7/12; B09B 3/00
[52] U.S. Cl. .................. 110/346; 110/246; 588/11
[58] Field of Search .................. 110/226, 236, 110/246, 346; 65/134.8; 588/11, 18

[56] References Cited

U.S. PATENT DOCUMENTS

| | | | |
|---|---|---|---|
| 4,846,083 | 7/1989 | Serbent | 110/245 X |
| 4,898,692 | 2/1990 | Rajan et al. | 588/11 |
| 5,005,493 | 4/1991 | Gitman . | |

FOREIGN PATENT DOCUMENTS

| | | | |
|---|---|---|---|
| 2014127 | 8/1979 | United Kingdom . | |
| 94/23856 | 10/1994 | WIPO | 110/346 |

*Primary Examiner*—Henry A. Bennett
*Assistant Examiner*—Susanne C. Tinker
*Attorney, Agent, or Firm*—Young & Thompson

[57] ABSTRACT

A process for the vitrification of products in the form of solid pieces or particles without the release of dust as a pollutant, according to which there is used a furnace (3) provided with a burner (15). There are introduced into the furnace the products to be vitrified, and the products are permitted to heat in the furnace until they form a liquid or pasty vitreous mass, then this vitreous mass is removed from the furnace and permitted to cool. The internal walls of the furnace are preheated with the burner to a temperature exceeding the temperature at which the products to be vitrified can form a liquid or pasty vitreous mass, then the energy supplied by the burner is reduced substantially or even cut off, before introducing waste into the furnace. The products are heated principally by receiving the heat transmitted from the internal walls of the furnace until all of the product is in the form of a liquid or pasty mass, the burner being maintained at reduced power or even shut off at least until this time. Then the products are discharged from the furnace. If desired, when all of the product has achieved the form of a pasty mass, the power of the burner is again increased until the product will be fairly fluid to permit its easy evacuation.

7 Claims, 1 Drawing Sheet

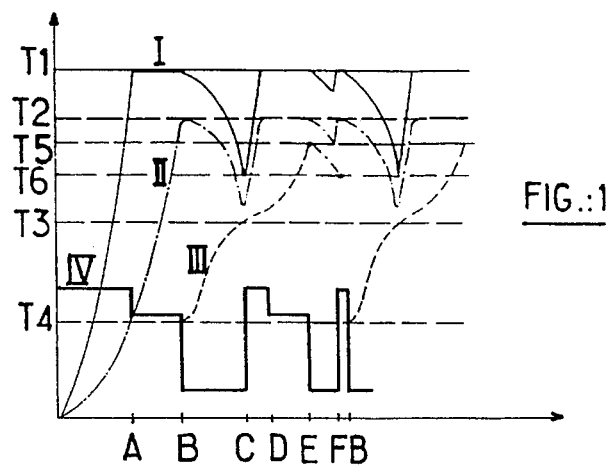
FIG.:1
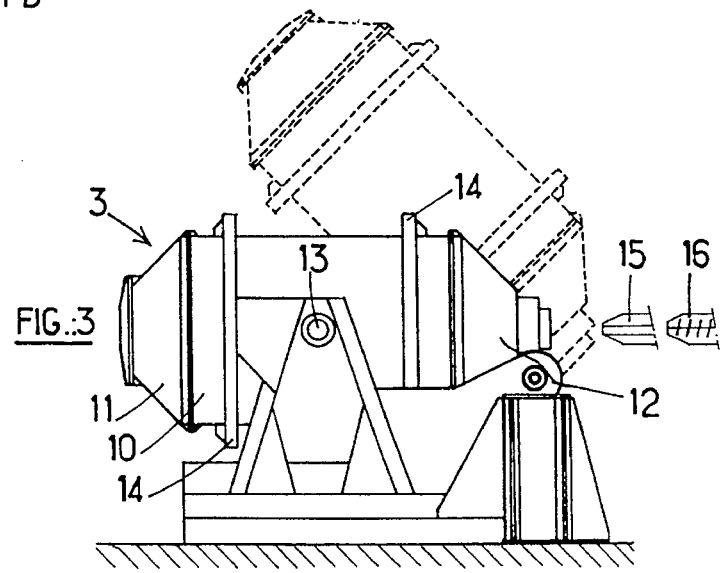
FIG.:3
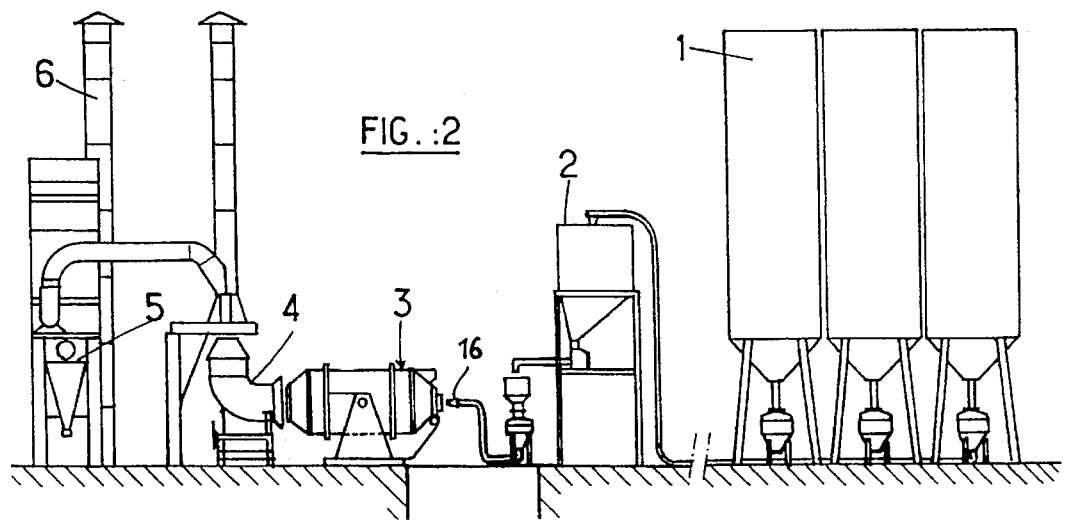
FIG.:2

PROCESS FOR THE VITRIFICATION OF PRODUCTS IN THE FORM OF SOLID PIECES OR PARTICLES

The present invention relates to a process for the vitrification of products in the form of solid pieces or particles.

A large number of industrial activities result in the production of solid waste containing sometimes important quantities of heavy metals, for example chromium, nickel, zinc, mercury, lead, cadmium, which are considered highly toxic. These wastes cannot in general be discharged because they can give rise to contamination of the subterranean waters.

This is particularly true of dust from burning household waste.

A physico-chemical separation of heavy metals, with recovery of the latter by filtration or decantation, is costly.

Another technique consists in vitrification, which is to say trapping of dangerous metals in an insoluble glass, obtained by fusion of solid waste with the addition as the case may be of glass and/or slag. The melting can be carried out in an electric furnace, an arc furnace, with a plasma torch, with submerged electrodes, etc. It can also be carried out in a furnace provided with burners, particularly gas burners.

Fusion can be effected in an electric furnace, arc furnace, by plasma torch, by submerged electrodes, etc. It can also be effected in a furnace provided with burners, particularly gas burners.

During heating of the products to be vitrified to the melting point, there are released fumes, which is to say gas from the substances contained in the products to be vitrified and which have been freed or rendered gaseous under the effect of high temperature. At the beginning of the operation, these gases, which are strongly turbulent, entrain particles of the product to be vitrified which have not been enveloped in the vitreous mass to be formed or in the course of formation.

It is therefore necessary to subject these gases to a treatment adapted to reduce pollution which they could cause, and this treatment increases the cost and complication proportionally as the requirements imposed by the polluting material become more severe.

The technique using burners is less costly as to capital cost and electrical energy consumption than the others, but the burner, when it is in action, produces gases which are in a greater quantity than those from the products to be vitrified, and therefore increase the size of the pollution problem and the requirement for reducing this pollution.

The present invention has for its object to provide a process for vitrification of solid substances which reduces the emission of fumes to a level such that only a very much simplified treatment will be necessary, or even so that the treatment of the fumes can be avoided, and which, at the same time, will be of low cost.

To obtain this result, the invention provides a process for vitrification of products in the form of solid pieces or particles, according to which there is used a furnace provided with heating means, there is introduced into the furnace the products to be vitrified, the products are heated in the furnace up to the formation of a liquid or pasty vitreous mass, then this vitreous mass is removed from the furnace and cooled to solidification, according to which process the internal walls of the furnace are preheated by means of heating to a temperature exceeding the temperature at which the products to be vitrified can form a liquid or pasty vitreous mass, the energy supplied by the heating means is reduced substantially before the introduction of the waste into the furnace, and the product is permitted to heat solely by receiving heat from the internal walls of the furnace until all of the product is in the form of a liquid or pasty mass, the heating means being maintained at reduced power at least until this time.

The power reduction of the heating means can consist in complete stopping of the latter. However, the ultimate re-ignition of a heating means is often accompanied by an abrupt increase in the pressure within the furnace, which is not desirable. Accordingly, it is preferred only to reduce the power of the heating means to a lesser value, which can for example be less than 30% of the maximum power.

The maximum temperature which the internal surface of the internal wall of the furnace can reach is a function of the nature of this wall and of that of the product to be treated. Above this temperature, the wall is in danger of physical degradation or a chemical reaction with the product to be treated. The quantity of heat which will be transmitted to the product by the furnace wall depends in particular on the mean temperature reached across the thickness of the wall, as well as the thickness and the thermal properties of this wall. It will be understood that the preheating of the internal walls of the furnace is an operation which must be optimized with precision in each case.

According to a preferred embodiment of operation, the power of the heating means is adjusted such that the internal surface of the wall of the furnace does not exceed a limit temperature depending particularly on the chemical composition of said wall and of the product.

In this way, the amplitude of the thermal cycles to which the wall of the furnace is subjected is limited, and the duration of the operating cycles is reduced.

It will be noted that, upon the reduction of the power of the burner, the furnace will cool because of thermal loss externally of the furnace. The interior of the furnace will therefore be of reduced pressure, all exit of the gas is avoided, except at most a small quantity of gas corresponding to the volume of the solid product to be vitrified.

The quantity of product to be vitrified which is introduced during an operation depends on the nature of this product, and on the characteristics of the furnace, the heat capacity and the thermal conductivity of the material of the walls of the furnace, as well as its external insulation. There exists an optimum quantity, which can be determined by tests having regard to the following points: a lower quantity gives rise to an excessive number of unit operations, and a larger quantity requires too great a heating time and increases the amplitude of the thermal cycles to which the furnace is subjected, or else does not give rise to all of the products taking part in a satisfactory vitrification phase.

Preferably, there is used a rotary furnace, typically of generally cylindrical or cylindro-conical shape, which is rotated with its axis maintained non-vertical during the formation of the liquid or pasty mass.

In this way, the vitreous mass undergoing formation sweeps the lateral walls of the furnace and absorbs the dust which can dwell there. There is thus avoided an accumulation of this dust, which could be placed in movement as a result.

Preferably, the axis of rotation of the furnace is maintained horizontal during formation of the liquid or pasty mass, and said axis is inclined to evacuate the liquid or pasty mass.

The heating means is preferably a burner. The advantages of low energy consumption and capital cost of this technique are preserved by the process of the invention, and its drawback as to pollution is very greatly reduced by the process of the invention. Preferably, there is used an oxy-burner supplied with air enriched in oxygen, and, in a more preferred manner, there is used a burner supplied with "pure" oxygen, which is to say a gaseous mixture containing at least 90% oxygen. Such burners have various advantages relative to conventional burners supplied with air and a liquid or solid combustible material. The energy output is better. The volume of gas produced is diminished, which reduces the size of the associated installations, such as the chimney. Moreover, the reduction in volume of gaseous product limits the entrainment of dust of the product to be vitrified which would have remained attached to the walls of the furnace.

Preferably, there is utilized as combustible material for the burner a gas or liquid which gives rise to no dust apt to pollute the environment.

Preferably, to decrease the heating time in the furnace, and to reduce the amplitude of the thermal cycles, and hence the fatigue of the furnace, a preheating of the product is conducted outside the furnace before introducing it into this latter.

For better use of energy, it is preferable to recover at least a portion of the heat of the vitreous mass or of the gases leaving the furnace for preheating outside the furnace of the product to be treated.

The invention will now be described in a more detailed manner with the help of a non-limiting practical example, illustrated in the drawings, in which:

FIG. 1 is a temperature diagram showing the different phases of a process according to the invention.

FIG. 2 is a simplified schematic view of an installation utilized according to the invention; and FIG. 3 is a view of the furnace of the installation of FIG. 2.

In FIG. 1, the curve I represents the variation of the flame temperature of the burner of the furnace, curve II represents the change of the surface temperature of the internal wall of the furnace, curve III represents the temperature change of a charge in the furnace, and at IV is represented the change of burner power. From the beginning, which corresponds to the beginning of a series of tests, the burner is lit, giving it maximum power, until the flame reaches a maximum temperature T1, which should not be exceeded, so as not to damage the furnace. From this moment, which corresponds to point A, the burner power is slightly reduced, so as to maintain a substantially constant flame temperature. During this time, the temperature of the internal wall of the furnace, represented by curve II, continues to rise to a temperature T2, which is the maximum wall temperature and is not to be exceeded. This temperature is reached at moment B. Then the burner is changed to reduced power, which is to say a lower power, and, immediately thereafter, the products to be treated and the vitreous complexes are introduced, which have previously been preheated to a temperature T4, substantially lower of course than temperature T2. The products then undergo heating while the furnace wall cools, both by direct transmission and by radiation. At moment C, the products have reached a temperature at which they are entirely in a pasty form, and the risk of dust emission has practically disappeared. At this time, the burner is reactivated to full power, and the temperature of the wall rises rapidly to substantially the temperature T2, while the temperature of the flame rapidly reaches temperature T1. At this time D, the power of the burner is again slightly limited, which also caps at temperature T2 the temperature of the wall, however the products continue to heat to a temperature at which they are sufficiently liquid to be evacuated to the outside. At this time E, the burner is returned to standby and the melted products are evacuated. These latter cool during evacuation, the wall of the furnace also cooling to a temperature T6. When evacuation is completed, at time F, the burner is turned up again until the internal wall of the furnace reaches temperature T2, for the introduction of a new load. Thus we are then back to the conditions described for time B, and the cycle can be repeated with a new charge of products to be treated.

FIG. 2 shows, in a schematic manner, an assembly of an installation according to the invention.

Silos 1 permit storing the product to be treated, and if desired additives permit lowering its melting or softening point.

Reference 2 designates an installation for dispensing and mixing. Reference 3 designates a furnace, which will be described later. Reference 4 corresponds to a conduit for removing fumes, which brings the gas to a dust removal cyclone 5, associated with a chimney 6.

Furnace 3 shown in FIG. 3 comprises a central cylindrical portion 10, and two truncated conical ends 11–12. The furnace is supported by horizontal pivots 13, orthogonal to the axis of the furnace, although the latter can swing between a position in which its axis is horizontal, to a position in which its axis is inclined at about 45° to the horizontal. Roller bearings 14 encircle the central portion of the furnace adjacent its ends. By cooperation with drive rollers, not shown, they permit driving the furnace 3 in rotation about its axis. The rotation of the furnace permits an excellent heat exchange between the charge and the walls of the furnace.

In the horizontal position, one of the ends 11 of the furnace is connected to the conduit 4 for evacuation of fumes shown in FIG. 2. The other end 12 of the furnace can receive either a gas and oxygen burner 15, or a loading device, such for example as an endless screw feeder 16, adapted to introduce the load into the furnace. The burner 15, like the supply device 16, is movable, so as to be able to be introduced into the end 12, or to be withdrawn. In phantom line, there is shown the position of the furnace during emptying of the product which has been transformed into a liquid mass.

In this position, of course, the burner 15 and the supply device 16 are withdrawn.

We claim:

1. In a process for the vitrification of products in the form of solid pieces or particles, in a furnace provided with heating means, comprising introducing into the furnace the products to be vitrified, heating the products in the furnace until the products form a liquid or pasty vitreous mass, then removing this vitreous mass from the furnace and permitting the vitreous mass to cool; the improvement comprising preheating the internal walls of the furnace with said heating means to a temperature exceeding the temperature at which the products to be vitrified can form a pasty vitreous mass, reducing substantially the energy supplied by the heating means before introducing said products into the furnace, introducing said products into the furnace, letting the products heat in the furnace principally by receiving heat transmitted from the internal walls of the furnace until all of the products is in the form of an at least pasty mass, maintaining the heating means at reduced power at least until this time, and discharging the products from the furnace.

2. Process according to claim 1, further comprising reducing the power of the heating means at least to a standby value, before introducing the products into the furnace.

3. Process according to claim 1, wherein the power of the heating means is adjusted such that the internal surface of the furnace wall will not exceed a wall limit temperature.

4. Process according to claim 1, wherein, when all of the products has achieved the form of a pasty mass, the power of the heating means is again increased until the products are fluid to permit easy discharge.

5. Process according to claim 1, wherein a rotating furnace is used, that it is rotated with its axis maintained non-vertical during the formation of the vitreous mass.

6. Process according to claim 5, wherein the axis of rotation of the furnace is maintained horizontal during the formation of said at least pasty mass, and said axis is inclined to discharge the products.

7. Process according to claim 1, wherein the heating means is an oxyburner whose flame is produced within the furnace and that is supplied with a gaseous mixture enriched to more than 90% oxygen.

* * * * *